United States Patent [19]
Flego et al.

[11] Patent Number: 5,518,978
[45] Date of Patent: May 21, 1996

[54] DIFUNCTIONAL CATALYST USEFUL IN WAX HYDROISOMERIZATION AND PROCESS FOR PREPARING IT

[75] Inventors: Cristina Flego, Trieste; Laura Zanibelli, Milan, both of Italy

[73] Assignees: Eniricerche S.p.A., Milan; Agip Petroli S.p.A., Rome, both of Italy

[21] Appl. No.: 241,585

[22] Filed: May 12, 1994

[30] Foreign Application Priority Data

May 12, 1993 [IT] Italy ................ MI93A0960

[51] Int. Cl.$^6$ .............. B01J 21/06; B01J 27/043
[52] U.S. Cl. ............. 502/222; 502/223; 502/242; 502/258; 502/262; 585/750
[58] Field of Search .................... 502/222, 223, 502/242, 258, 262; 585/750

[56] References Cited

U.S. PATENT DOCUMENTS 5,145,825  9/1992  Deeba et al. .
5,444,032  8/1995  Perego et al. ............ 502/235

FOREIGN PATENT DOCUMENTS 0585065  3/1994  European Pat. Off. .
2576031  7/1986  France .

*Primary Examiner*—Ponnathapura Achutamurthy
*Attorney, Agent, or Firm*—Oblon, Spivak, McClelland, Maier, & Neustadt

[57] ABSTRACT

A difunctional catalyst is disclosed which is constituted by:
(a) silica particles partially coated with zirconia, acidified by means of the introduction of sulfate moieties,
(b) one or more metal(s) from Group VIIIA.

The preparation of said catalyst and its use in wax hydroisomerization are disclosed as well.

12 Claims, 3 Drawing Sheets though introduced in a manner similar to those known from the prior art, are present at lower concentrations than of known catalysts, displays good characteristics of isomerization selectivity at higher n-paraffin conversion rates than as reported hereinabove.

DIFUNCTIONAL CATALYST USEFUL IN WAX HYDROISOMERIZATION AND PROCESS FOR PREPARING IT

The present invention relates to a difunctional catalyst useful in the hydromerization of waxes, and to the process for preparing it More particularly, the present invention relates to a difunctional catalyst consisting of:

(a) silica particles partially coated with zirconia and acidified by means of the introduction of sulfate moieties, (b) one or more metals belonging to Group VIIIA.

The present invention relates as well to the preparation of the above said catalyst and the use thereof in the hydroisomerization of waxes.

The process for wax isomerization to yield bases for lubricant oils characterized by low "pour point" and high viscosity index values, requires that suitable catalysts are used.

In fact, the waxes, mainly (>80% by weight) constituted by n-paraffins having more than 15 carbon atoms, solid at room temperature, must be converted into their corresponding branched isomers, which display a lower melting point than the linear isomers.

For instance, n-$C_{16}$ paraffin has a melting point of 19° C., whereas its 5-methyl pentadecane isomer melts at −31° C.

However, an effective hydroisomerization catalyst should keep the possible cracking and hydrocracking reactions, which are catalyzed by the same acidic sites and have, as their intermediates, the same useful carbocations for hydroisomerization, to a minimum. These secondary reactions lead to the degradation of the molecule, with lighter, less valuable products being formed, which must be removed from the end product because they increase the volatility thereof; of course, this constitutes a burden for the overall process.

For this process, difunctional catalysts were developed, i.e., catalysts having both acidic sites and hydro-dehydrogenation active sites. The acidity is given to the catalyst by the selected carrier type, and its function precisely is the isomerizing property.

The hydro-dehydrogenation activity is given to the catalyst by the deposited metal phase, the function of which is also of keeping cracking to a minimum.

It was demonstrated in the past (J. F. Le Page, Applied Heterogeneous Catalysis, Ed. Technip, Paris, 1987, 435–466) that, with the hydrogenating activity being the same, the most selective catalysts are those in which the carrier displays a controlled acidity, so as to maximize the isomerization of n-paraffins at the expense of cracking. However, inasmuch as the cracking reactions follow isomerization, the maximal. isomerization selectivity is obtained at low conversion levels (G. Froment et al., Ind. Eng. Chem. Prod. Res. Dev., 1981, 20, p. 654–660).

The effectiveness of various catalysts can be evaluated on model compounds as n-paraffins, by measuring the selectivity thereof, i.e., the ratio of the isomerization products to the cracking products at a given level of n-paraffin conversion.

From most recent patents, EP-A-321,307 discloses a process for hydroisomerizing waxes in order to produce bases for lubricant oils, according to which a hydroisomerization step is carried out in the presence of a particular catalyst. The latter contains from 0.1 to 5% by weight of a metal belonging to Group VI or Group VIII A, preferably Group VIII A, still more preferably a noble metal from Group VIII A, and, in most preferred from, platinum supported on a halogenated, preferably fluorinated, inorganic refractory oxide carrier.

It is well-known that halogenating an inorganic oxide increases the acidity thereof. In particular, the surficial acidity of fluorinated aluminas and their catalytic activity in reactions via carbocation is a function of fluorine content. (R. Covini, V. Fattore, N. Giordano, J. Catal., 1967, 9, 315–321).

U.S. Pat. No. 4,975,177 discloses another process for hydroisomerizing waxes, in which a hydroisomerization step is carried out in the presence of a catalyst constituted by beta zeolite plus a further component which is effective in hydrogenation-dehydrogenation, preferably a noble metal. This catalyst displays a high $SiO_2/Al_2O_3$ ratio, of at least 30, preferably higher than 50, e.g., comprised within the range of from 100 to 500, in order to reduce the acidity thereof, and consequently the possible cracking reactions.

Both above said patents, as regards the process, state that the wax conversion rates are limited to a level comprised within the range of from 20 to 40% by weight, in order to minimize the formation of light cracking products.

The catalyst disclosed in EP-A-321,307 displays the drawback that it must be prepared by starting from a so highly toxic and corrosive reactant as HF, dissolved in water together with $NH_4F$.

The process disclosed in U.S. Pat. No. 4,975,177 makes use of a catalyst in which beta zeolite is prepared according to as disclosed in U.S. Pat. Nos. 3,308,069, 4,419,220 and U.S. Pat. No. 4,518,485. Owing to the low $SiO_2/Al_2O_3$ ratio typical for this beta zeolite, a dealumitation of the starting zeolite must be carried out by steaming and/or acidic treatment, in order to obtain acceptable selectivity rates. In fact, owing to the high acidity of the zeolites, under the hydroisomerization conditions the cracking reaction is very competitive with the isomerization reaction. The dealumination implies the addition of a further step to the total process for catalyst synthesis, which, by being a crystallization under hydrothermal conditions already is, per se, a complex preparation.

Materials with acidic character and displaying an isomerizing activity are also oxides of metals from Groups IIa, IIIa, IVa, IVb and VIII, acidified by means of the introduction of a sulfate moiety. These catalysts display a high acidic strength and many of these are defined "super acids". The need for having available a support with acidic strength limited within a well-defined range led to modify this class of materials, by blending different oxide compounds.

For example, in U.S. Pat. No. 4,547,283, reference is made to a material constituted by silica or, in general, by refractory oxides, treated by impregnation with reactive metal compounds (1–7% by weight/weight), considerably large amounts of which are bound to the surface, to form mono- or multi-layer coats. Also an oxidation catalyst is known which is constituted by silica particles coated with titania or zirconia, or precursors thereof, on which platinum is deposited (U.S. Pat. No. 5,145,825).

The need for having available a carrier with good heat stability, during the sintering steps of both said carrier and of the metal phase subsequently added to it, leads to the formation of a surficial mixture of oxides. In particular, the target aimed at by modifying the bulk effect of zirconia with silica, is of reducing the high acidity of $SO_4^=/ZrO_2$ system, while simultaneously stabilizing the sulfate group—silica linkage to temperature.

The present Applicant found now, according to the present invention, that a catalyst constituted by silica particles partially coated with zirconia and on which acidic groups, such as the $SO_4^=$ moieties were added, and a metal from Group VIIIA, in particular platinum, results to be effective in paraffin hydroisomerization.

In accordance therewith, the present invention relates to a difunctional catalyst effective in wax hydroisomerization, having a specific surface area comprised within the range of from 300 to 700 $m^2/g$, characterized in that it comprises:

(a) silica particles having a specific surface area comprised within the range of from 500 to 1000 $m^2/g$ partially coated with $ZrO_2$, with the coverage thereof being comprised within the range of from 10 to 90%, and provided with sulfate moieties, with said sulfate moieties being present in amounts comprised within the range of from 3 to 24% by weight, (b) one of more metal(s) belonging to Group VIIIA, in amounts comprised within the range of from 0.05 to 5% by weight.

By the expression "coverage", the percentage of silica surface covered with zirconia is meant.

According to the preferred embodiment, the catalyst according to the present invention has a surface coverage comprised within the range of from 25 to 70%; the metal from Group VIIIA, preferably platinum, is contained in an amount comprised within the range of from 0.05 to 5% by weight, preferably of from 0.01 to 2%, and sulfate moieties are present in amounts comprised within the range of from 3 to 24% by weight, preferably of from 5 to 18% by weight.

A second object of the present invention relates to a process for preparing effective catalysts for wax hydroisomerization, which comprises the following steps:

(A) partial coating with zirconia, of silica particles having a specific surface area comprised within the range of from 500 to 1000 $m^2/g$, obtained by contacting said silica particles with a zirconium salt in alcoholic solution, subsequent separation, drying and calcination;

(B) impregnation with aqueous sulfuric acid, of the particles obtained from the (A) step, subsequent drying and calcination;

(C) impregnation of the particles obtained from the (B) step, with aqueous solutions of salts or acids of metals from Group VIIIA, and subsequent drying and calcination.

The catalysts according to the present invention are prepared by starting from $SiO_2$ having a specific surface area comprised within the range of from 500 to 1000 $m^2/g$. The partial coating of the above said silica with zirconia is obtained according to as reported in "Preparation of zirconium oxide on silica and characterization by X-ray photoelectron spectroscopy, secondary ion mass spectometry, temperature programmed oxidation and infra-red spectroscopy", Applied Catalysis, 70 (1991) p. 53–71.

According to a modification of the above said procedure, silica particles are brought into contact, at 10°–50° C., with stirring and during a time of from 10 to 30 hours, with alcoholic solutions of zirconium salts, preferably zirconium alkoxides. Particularly suitable was found an anhydrous ethanolic solution of zirconium propoxide in the presence of an acid, such as glacial acetic acid. During this step, not all silica surface is coated with zirconia. Water presence should be avoided in order to maximize the reaction between silica and zirconium alkoxide.

The amount of zirconium precursor is predetermined on the basis of the desired coverage. For example, when using an $SiO_2$ grade with a specific surface area of 900 $m^2/g$, and if a coverage of about 70% is desired, approximately 3 grams of $Zr(OEt)_4$ should be used per each gram of $SiO_2$. When, on the contrary, a silica with a specific surface area of 500 $m^2/g$ is used, and a coverage of 30% is desired, about 1 gram of $SiO_2$. If, on the contrary, a silica having a specific surface area of 500 $m^2/g$ is used and a coverage of 30% is desired, in the (A) step about 1 gram of $Zr(OPr)_4$ per gram of $SiO_2$ should be used.

Figure 1:
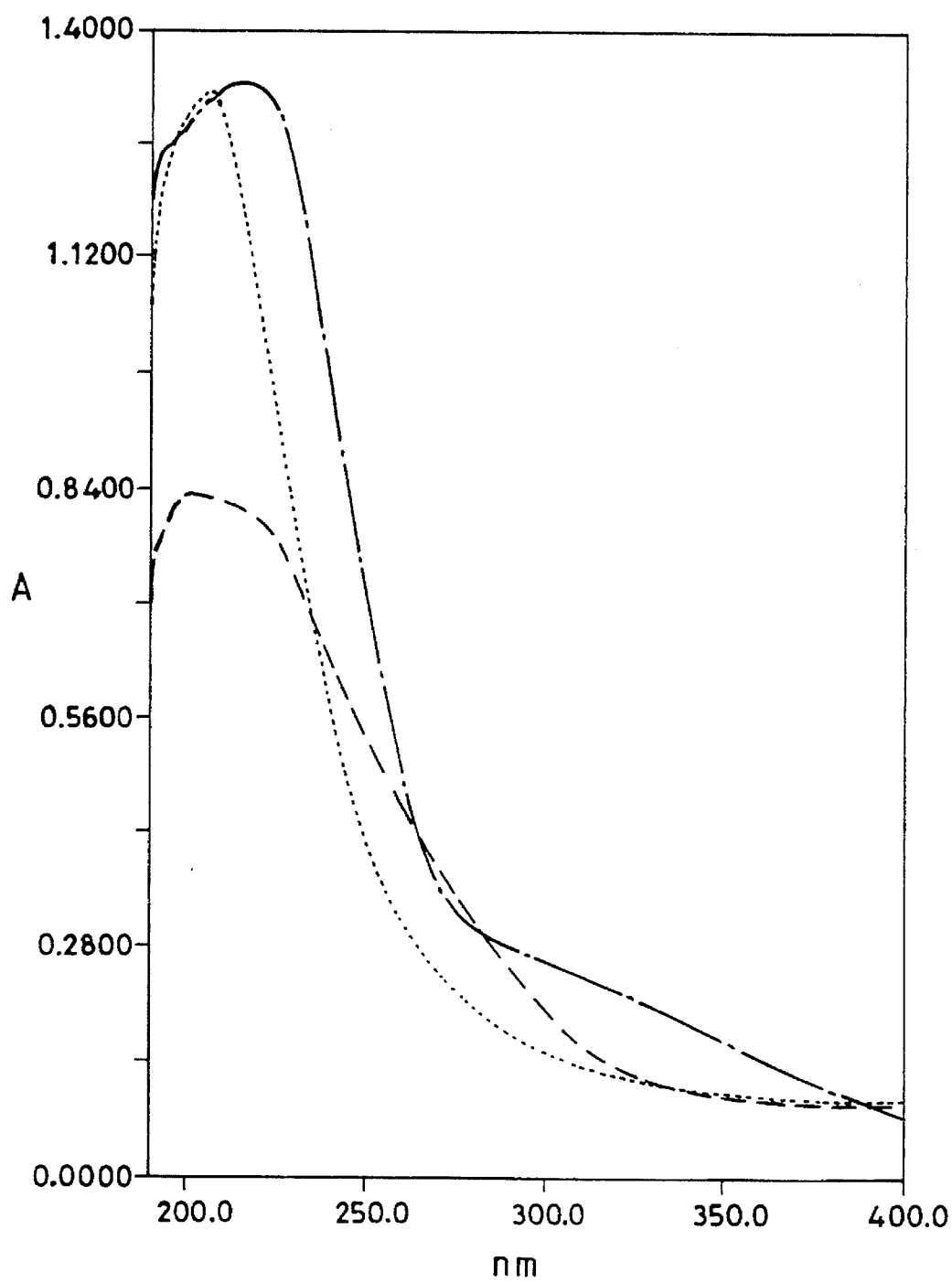
FIG. 1 is a UV spectrum of the zirconia-coated silica particles.

After separating the solid particles and washing them, said particles are dried, preferably in air at 40°–70° C. during a time of from 5 to 34 hours, then they are calcined in air at approximately 400°–600° C. During this step, the zirconium particles are converted into zirconia ($ZrO_2$). The resulting particles are actually different from both silica and zirconia. In fact, their U.V. spectrum (FIG. 1, dotted line . . . . ) displays an absorption peak at 206 nm, which is quite different from the peak displayed by silica (202 nm, short-dashed line ----) and by zirconia (216 nm, chain line -----). The coverage of silica particles is comprised within the range of from 10 to 90%.

Said coverage can be calculated when one knows:

the zirconium amount present, by chemical analysis;

the average Zr-0 spacing, from crystallographic data; and the specific surface area of $SiO_2$, by B.E.T. determination.

The resulting zirconia-coated silica particles obtained according to (A) step, are then submitted to impregnation by being brought into contact, with stirring, with a sulfating agent selected from sulfuric acid and aqueous solutions of a sulfate salt.

The (B) step impregnation is preferably carried out with aqueous sulfuric acid or an aqueous solution of ammonium sulfate at a concentration comprised within the range of from 0.4 to 0.5 M. The technique is the one which is known as "wetness imbibition" and consists in impregnating with a volume of aqueous sulfuric acid, which is slightly larger than the total pore volume. The impregnation is carried out at a temperature comprised within the range of from 10° to 40° C., preferably of from 15° to 25° C., by leaving the silica partially coated with zirconia, into contact with the impregnating agent during a time period of from 12 to 48 hours. The usual operations follow of drying, preferably at 60°–100° C. in air, and calcination in an oxidizing atmosphere, preferably air, at a temperature comprised within the range of from 400° to 600° C.

Figure 2:
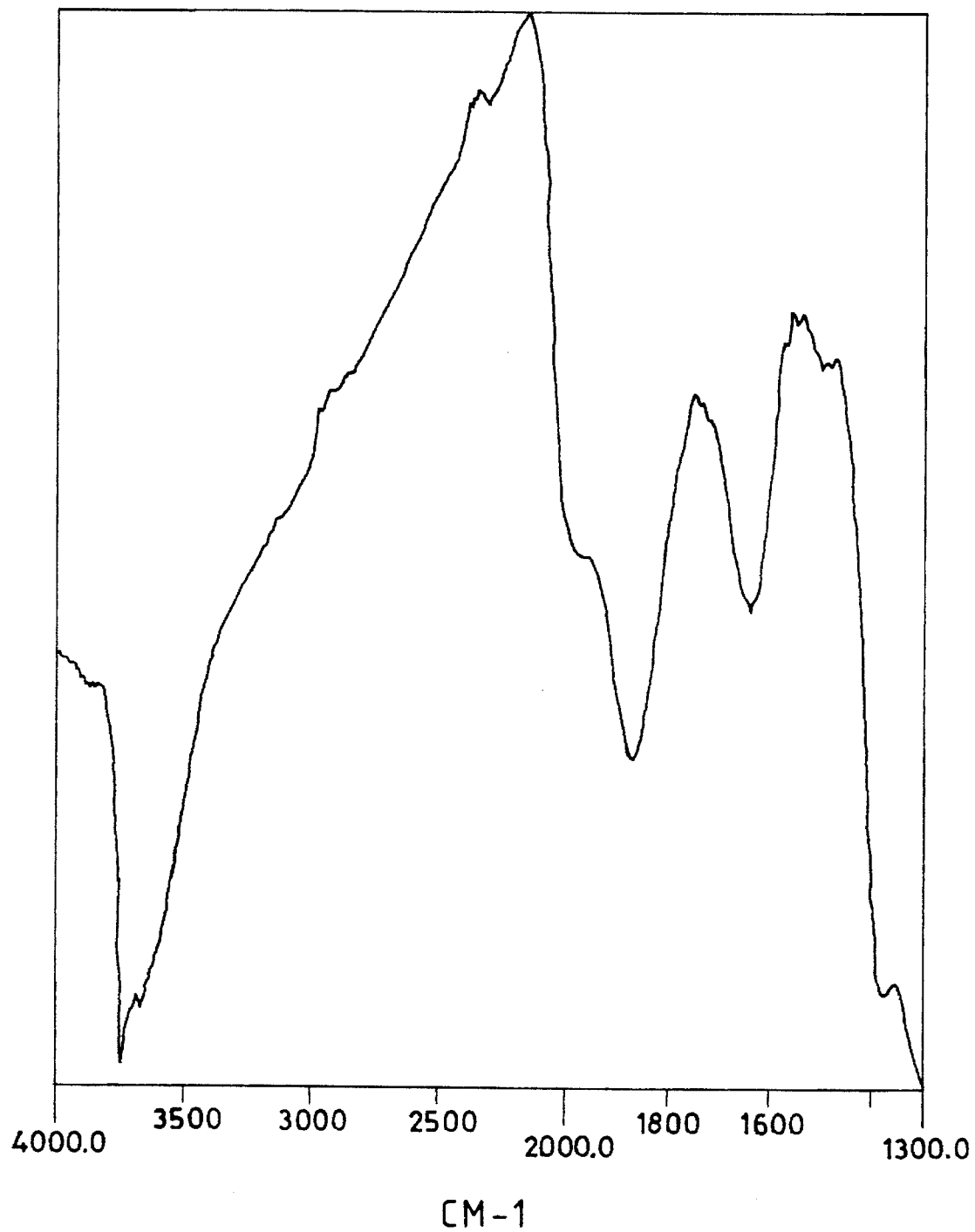
FIG. 2 is an IR absorbtion spectrum of the sulfate-treated zirconia-coated silica particles.

For confirmation that the product obtained from the (B) step is consituted by zirconia-coated silica particles having sulfate moieties at their surface, in FIG. 2 the I.R. absorption spectra is reported of the product obtained from the (B) step. In fact, the absorption peak at 1378 $cm^{-1}$ is due to the asymmetrical vibration of S=O linkage in the $O_2S(O-)_2$ moiety bridging two metal atoms, the absorption peak at 3640 $cm^{-1}$ is generated by the hydroxy moieties of zirconia, and the absorption peak at 3740 $cm^{-1}$ is generated by —SiOH groups.

The product obtained from the (B) step is submitted, in the (C) step, to impregnation and subsequent treatments according to the same modalities as reported for the (B) step. The only difference consists in that the impregnating agent is constituted by an aqueous solution of a salt or acid of a metal belonging to Group VIIIA, preferably platinum. In the latter case, an aqueous solution of $H_2PtCl_6$ can be advantageously used. The presence of the above said metal supplies the end catalyst with the required hydro-dehydrogenating character.

The catalyst prepared according to the above techniques is active in the hydroisomerization process, which can be carried out either continuously or batchwise.

The hydroisomerization is advantageously carried out in the presence of $H_2$, at a temperature comprised within the range of from 200° to 540° C., preferably of from 250° to 450° C., and under a pressure which can range from atmospheric pressure up to 25,000 KPa, preferably of from 4000 to 10,000 KPa.

The effective catalyst amount, expressed as a percent by weight based on n-paraffin or n-paraffin mixtures to be hydroisomerized, is generally comprised within the range of from 0.5 to 30% by weight, preferably of from I to 15% by weight.

The following experimental examples are reported in order to better illustrate the present invention.

EXAMPLE 1

An amount of 7.3 g of zirconium propoxide is dissolved, at room temperature, and with stirring, in 70 ml of anhydrous ethanol, in the presence of 1 ml of glacial acetic acid. To the resulting clear solution, 5 g of Grace—Grade 175 $SiO_2$ and the resulting suspension is kept with stirring during 24 hours, still at room temperature. Thereafter, the silica-zirconia based material is centrifuged off and is washed with anhydrous ethanol in order to eliminate any unreacted Zr precursor. The resulting material is dried at 50° C. during 16 hours in air and is calcined at 550° C. during 6 hours under a flowing air stream. The so prepared material is used as a carrier for the end catalyst, after being impregnated with a Pt and sulfate moiety precursor.

More particularly, to 10 g of zirconia-coated silica charged to a crystallizer, 21.07 ml of a 0.44M solution of $H_2SO_4$ is added dropwise, with careful mixing. The materials are allowed to stay into contact for 16 hours, then water is evaporated off during 1 hour at 70° C. in air. The resulting solid material is calcined at 550° C. during 3 hours under a flowing air stream, with the muffle being heated from 23° to 550° C. during a 1-hour time. The impregnation with an aqueous solution containing 0.45% of $H_2PtCl_6$ by weight/volume, is carried out according to the same modalities as the preceding one.

In Table 1, the characteristics of this catalyst are reported in the (A) step (defined as "Carrier" in Table 1) and in the (C) step (defined as "Catalyst").

Figure 3:
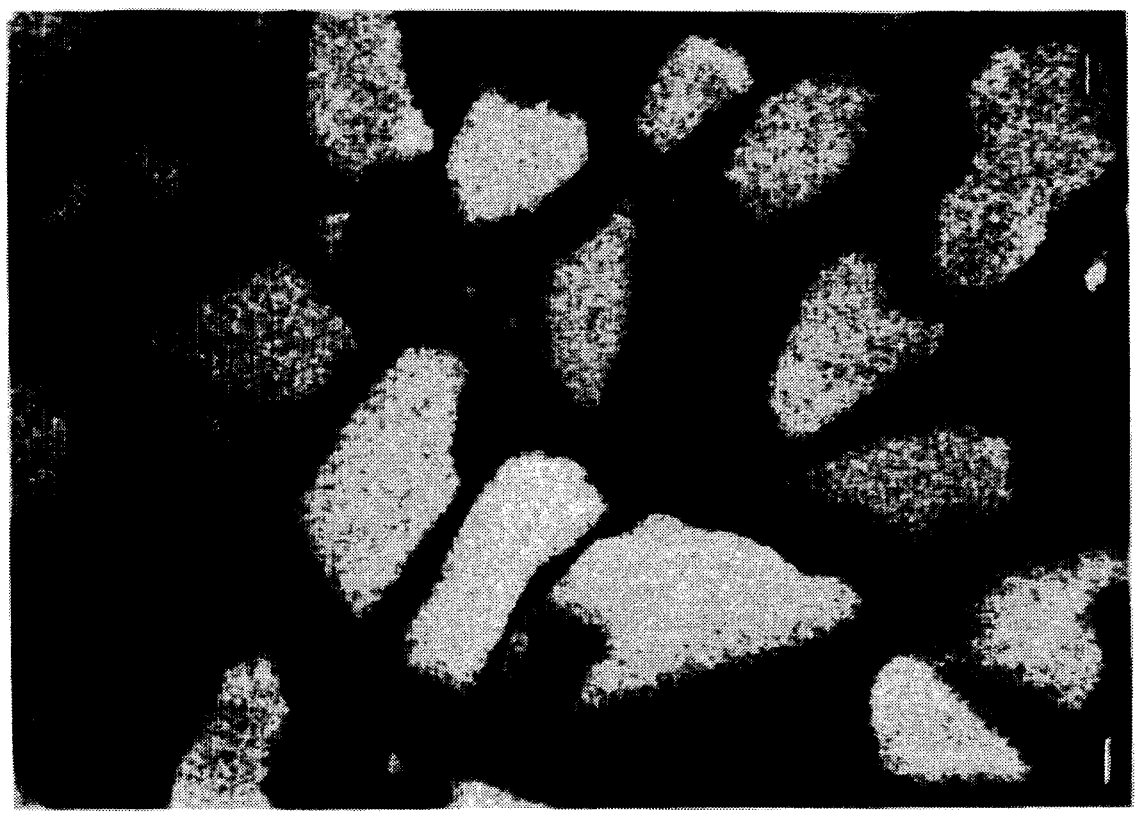
FIG. 3 is an X-ray diffraction pattern of the catalyst of the invention.

The product results to be amorphous at X rays. In FIG. 3, an EDS pattern is reported which was obtained by means of an X ray microprobe coupled with a scanning electron microscope (SEM), performed on the catalyst prepared according to as reported above. The lighter region in the surface layer of the particles is prevailingly constituted by zirconia and the darker region in the interior is prevailingly constituted by silica. The chemical analysis of both layers confirms this attribution.

EXAMPLE 2

An amount of 11.0 g of zirconium propoxide is dissolved, at room temperature, and with stirring, in 70 ml of anhydrous ethanol, in the presence of 1 ml of glacial acetic acid. To the resulting clear solution, 5 g of Grace—Grade 175 $SiO_2$ and the resulting suspension is kept with stirring during 24 hours, still at room temperature. Thereafter, the silica-zirconia based material is centrifuged off and is washed with anhydrous ethanol in order to remove any unreacted Zr precursor. The resulting material is dried at 50° C. during 16 hours in air and is calcined at 550° C. during 6 hours under a flowing air stream. The so prepared material is used as a carrier for the end catalyst, after being impregnated with a Pt and sulfate moiety precursor.

More particularly, to 10 g of zirconia-coated silica charged to a crystallizer, 21.07 ml of a solution containing $H_2PtCl_6$ (0.45% by weight/volume) and $H_2SO_4$ (0.44M) is added dropwise, with careful mixing. The materials are allowed to stay into contact for 16 hours, then water is evaporated off during 1 hour at 70° C. in air. The resulting solid material is fired at 550° C. during 3 hours under a flowing air stream, with the muffle being heated from 23° to 550° C. during 1 hour.

The characteristics of this catalyst are reported in Table 1.

EXAMPLE 3 (Comparison Example)

A reference catalyst is prepared which is constituted by platinum supported on sulfated zirconia.

The sulfated zirconia is prepared as disclosed in EP-A-0 520 543.

100 g of zirconyl chloride ($ZrOCL_2.8 H_2O$) is dissolved in 230 ml of demineralized water, with strong stirring, at room temperature. The clear solution (pH=0) is titrated with 50 ml of 30% $NH_4OH$; the end pH value of the solution results to be 8.88. A jelly mass is formed, which is filtered and washed with plentiful demineralized water until neutral and no chloride can be demonstrated any longer in wash liquors. The resulting material is crushed and is charged to a dish in order to be dried at 250° C. during 24 hours under a static air atmosphere.

The dried zirconium oxide is impregnated by wetness imbibition with $H_2SO_4$ and then with $H_2PtCl_6$.

A volume of 3.6 ml of (1.2M) $H_2SO_4$ is added dropwise to 4.5 g of $ZrO_2$ charged to a crystallizer. The solution is allowed to stay into contact for 16 hours and then the mixture is oven-dried at 70° C. The calcination is carried out in muffle at 550° C. during 3 hours under a flowing air stream. An analogous impregnation treatment is carried out with an aqueous solution of $H_2PtCl_6$ (0.45% by weight/volume).

The characteristics of this catalyst are reported in Table 1.

EXAMPLE 4 (Comparison Example)

For comparison purposes, also a catalyst based on zirconia-coated silica on which platinum is supported, is reported. In this example, the acidification treatment by deposition of sulfate moieties is not carried out.

The carrier prepared as disclosed in Example 1 is impregnated with an aqueous solution of $H_2PtCl_6$ (0.45% by weight/volume) according to such modalities as disclosed in the same example.

The characteristics of this catalyst are reported in Table 1.

EXAMPLE 5 (Comparison Example)

The preparation is reported of a catalyst constituted by a silica carrier on to which precursors of $SO_{4=}$ moiety and Pt are deposited during two sequential impregnation steps.

On an amount of 5 g of Grace—Grade 175 silica, 14 ml of a 3.25M solution of $H_2SO_4$ is added dropwise. The solution is allowed to stay into contact with the silica during 16 hours and thereafter the reaction mixture is dried at 70° C. during 1 hour. After calcination, carried out at 550° C. during 3 hours under a flowing air stream, a further impregnation with 14 ml of an aqueous solution of $H_2PtCl_6$ (0.21% by weight/volume) is carried out by operating according to similar modalities.

The characteristics of this catalyst are reported in Table 1.

In said Table 1, "Carrier" means the catalyst at the end of the (A) step of its preparation, or, generally, before the impregnation steps with sulfate moieties and Pt.

TABLE 1

| Catalyst | % Zr (w/w) | B.E.T. Specific surface Area (m²/g) | Surface % coverage | % $SO_4^=$ content (w/w) | % Metal content (w/w) | B.E.T. Specific surface Area (m²/g) |
|---|---|---|---|---|---|---|
| | | Carrier | | | Catalyst | |
| Example 1 | 19.4 | 382.3 | 32.5 | 9 | 0.5 | 361.3 |
| Example 2 | 17.4 | 396.5 | 29.1 | 9 | 0.5 | 375.2 |
| Example 3 | 100.0 | 239.2 | — | 9 | 0.5 | 180.6 |
| Example 4 | 19.4 | 382.3 | 32.5 | — | 0.5 | 373.0 |
| Example 5 | 0 | 573.4 | 0 | 9 | 0.5 | 486.5 |

EXAMPLE 6 (Comparison Example)

A reference catalyst constituted by platinum supported on a beta-zeolite carrier is prepared.

Beta zeolite is prepared according to similar conditions as disclosed in U.S. Pat. No. 3,308,069.

To an amount of 58.4 g of demineralized water, 59,8 g of an aqueous solution at 40% by weight/weight of tetraethyl ammonium hydroxide (TEA-OH) and 1.9 g of sodium aluminate are added. The mixture is heated to about 80° C. and is kept with stirring until $NaAlO_2$ has completely gone into solution. The resulting solution is added to 48.7 g of Ludox HS colloidal silica at 40% by weight, such as to yield a molar ratio of $SiO_2/Al_2O_3=28$.

The so obtained homogeneous suspension, having pH=14, is charged to a stainless steel autoclave and is allowed to crystallize under hydrothermal conditions, in an oven at 150° C. during 10 days, under static conditions, under its autogenous pressure. The crystallized product is filtered off, washed, dried for 1 hour at 120° C., calcined for 5 hours at 550° C. and exchanged into its acidic form by exchange with ammonium acetate and subsequent calcination under the above indicated conditions.

The Pt metal phase is deposited onto the beta zeolite by aqueous impregnation.

In particular, over 10 g of beta zeolite charged to a crystallizer, 12.06 ml is added dropwise of an aqueous solution containing $H_2PtCl_6$ (0.45% by weight/volume) and HCl (0.6M), with careful mixing. The solution is allowed to stay into contact with the beta zeolite during 16 hours, then water is evaporated during I hour at the temperature at 60° C., in air, and the sample is then dried during 2 hours at 150° C., still in air. The calcination is carried out at 500° C. during 3 hours under a flowing air stream, with the muffle being heated from 23° to 500° C. during 90 minutes.

EXAMPLE 7

The catalyst according to Example 1 was tested in the reactions of hydroisomerization of n-$C_{16}$ paraffin in a microautoclave, under the following conditions.

The microautoclave is constituted by a steel body and a cover provided with a plurality of valves for pressurizing, venting and, if so required, recovering the gas products, and with a safety disk. The stirring system is constituted by a thin internal metal bar.

The reactor is charged with 8 g of $C_{16}$ paraffin and 0.25 g of catalyst. The system is pressurized when cold with $H_2$, to 5 MPa, and then is heated t.o 360° C., The time point when the temperature inside the reactor reaches the desired value, is taken as "zero time". When 120 minutes have elapsed, the reactor is cooled and vented and the reaction mixture is recovered. The analysis of the product in order to determine the conversion rate and their distribution is directly carried out on the resulting mixture by gas chromatography (HP-1 crosslinked methyl silicone gum column, atomic emission detector).

In Table 2, the conversion and selectivity rates are reported, which are calculated as follows:

$$\text{n-}C_{16} \text{ conversion} = 1 - \frac{\text{unreacted n-}C_{16} \text{ area}}{\text{total hydrocarbon area}}$$

$$\text{Selectivity to iso-}C_{16} = \frac{\text{iso-}C_{16} \text{ product area}}{\text{total product area}}$$

$$\text{Selectivity to } C_{15^-} = \frac{C_{15^-} \text{ product area}}{\text{total product area}}$$

wherein:

iso-$C_{16}$ is the mixture of isomeric species with carbon atoms, and $C_{5^-}$ is the mixture of cracking products, having less than 15 carbon atoms.

EXAMPLE 8

A catalyst according to Example 2 is tested in the hydroisomerization of n-$C_{16}$ paraffins. The reaction conditions are kept equal to those of Example 7. The values of conversion and selectivity rate are reported in Table 2.

EXAMPLE 9

A catalyst according to Example 1 is tested in the hydroisomerization of n-$C_{16}$ paraffins. The reaction conditions are kept equal to those of Example 7, except for temperature being decreased down to 340° C. The values of conversion and selectivity rate are reported in Table 2.

EXAMPLE 1.0 (Comparison Example)

A catalyst according to Example 3 is tested in the hydroisomerization of n-$C_{16}$ paraffins. The reaction conditions are kept equal to those of Example 7. The values of conversion and selectivity rate are reported in Table 2.

EXAMPLE 1 (Comparison Example)

A catalyst according to Example 4 is tested in the hydroisomerization of n-$C_{16}$ paraffins. The reaction conditions are kept equal to those of Example 7. The values of conversion and selectivity rate are reported in Table 2.

EXAMPLE 1 (Comparison Example)

A catalyst according to Example 5 is tested in the hydroisomerization of n-$C_{16}$ paraffins. The reaction conditions are kept equal to those of Example 7. The values of conversion and selectivity rate are reported in Table 2.

EXAMPLE 13 (Comparison Example)

The catalyst taken for reference purposes 6 is tested in the hydroisomerization of n-$C_{16}$ paraffins. The reaction conditions are kept equal to those of Example 7. The values of conversion and selectivity rate are reported in Table 2.

TABLE 2

| Example | Conversion rate, % | iso-$C_{16}$ % produced | $C_{15}$— % produced |
|---|---|---|---|
| 7 | 52.9 | 49.8 | 3.1 |
| 8 | 66.6 | 56.9 | 9.7 |
| 9* | 27.9 | 27.2 | 0.7 |
| 10 (Comp. Example) | 53.4 | 15.4 | 38.0 |
| 11 (Comp. Example) | 2.1 | 1.8 | 0.3 |
| 12 (Comp. Example) | 2.6 | 2.1 | 0.5 |
| 13 (Comp. Example) | 86.0 | 13.3 | 12.7 |

Reaction conditions:
T = 360° C., $P_{H2}$ = 5 MPa, n-$C_{16}$/cat = 8/0.25; t = 120 min.
(*) T = 340° C.

From Examples 7 and 8, one may see that the coverage of silica surface with zirconia influences the conversion obtaines, with the other operating conditions being the same.

The processes known from technical literature for wax hydroisomerization (e.g., U.S. Pat. No. 4,975,177 and EP-A-321,307), keep the conversions at values comprised within the range of from 20 to 40% by weight in order to limit the cracking byproducts; the catalyst of Example 9 has such a catalytic activity as to produce conversion rates falling within the range taken into consideration, with extremely good selectivity rates to iso-$C_{16}$ products.

From Examples 7, 8 and 9, it was verified that the catalysts according to the present invention display a higher hydroisomerization selectivity and a more interesting conversion rate, with the other operating conditions being the same, than that of a catalyst taken as the reference catalyst (Example 13).

From Example 10, one may see that the catalyst prepared in Example 3 displays an excessively high acidity which causes, at comparable conversion values to those of Example 7, a one order of magnitude higher selectivity to cracking products. From Examples 11 and 12, the absence of activity is confirmed both as regards the carrier based on silica particles coated with zirconia (catalyst according to Example 4), and of silica treated with sulfate moieties (catalyst according to Example 5).

We claim:

1. Difunctional catalyst effective in wax hydroisomerization, having a specific surface area comprised within the range of from 300 to 700 $m^2/g$, characterized in that it comprises:
   (a) silica particles having a specific surface area comprised within the range of from 500 to 1000 $m^2/g$ partially covered with a coating of $ZrO_2$, with the coverage being comprised within the range of from 10 to 90%, and having sulfate moieties at their surface, with said sulfate moieties being present in amounts comprised within the range of from 3 to 24% by weight,
   (b) one of more metal(s) belonging to Group VIIIA, in amounts comprised within the range of from 0.05 to 5% by weight.

2. Catalyst according claim 1, characterized in that the silica particle coverage with zirconia is comprised with the range of from 25 to 70%.

3. Catalyst according to claim 1, characterized in that said sulfate moieties are present in amounts comprised within the range of from 5 to 18% by weight.

4. Catalyst according to claim 1, characterized in that the content of metal selected from those metals belonging to Group VIIIA is comprised within the range of from 0.01 to 2% by weight.

5. Catalyst according to any one of the preceding claims, characterized in that said metal selected from those metals which belong to Group VIIIA, is platinum.

6. Process for preparing effective catalysts for the hydroisomerization of waxes according to claim 1, which comprises the following steps:
   (A) partial coating with zirconia, of silica particles having a specific surface area comprised within the range of from 500 to 1000 $m^2/g$, obtained by contacting said silica particles with a zirconium salt in alcoholic solution, and subsequent separation, drying and calcination;
   (B) impregnation with aqueous sulfuric acid, or aqueous ammonium sulfate, of the particles obtained from the (A) step, and subsequent drying and calcination;
   (C) impregnation with aqueous solutions of salts or acids of metals from Group VIIIA, and subsequent drying and calcination.

7. Process according to claim 6, characterized in that the zirconium salt used in the (A) step is a zirconium alkoxide.

8. Process according to claim 6, characterized in that in the (B) step, the aqueous sulfuric acid or aqueous ammonium sulfate has a concentration comprised within the range of from 0.4 to 0.5M.

9. Process according to claim 6, characterized in that the Group VIIIA metal is platinum.

10. Process according to any one of claims from 6 to 9, characterized in that, apart from the drying and calcination operations, all of the operations of steps from (A) to (C) are carried out at temperatures comprised within the range of from 10° to 40° C.

11. Process according to claim 10, characterized in that, apart from the drying and calcination operations, all of the operations of steps from (A) to (C) are carried out at temperatures comprised within the range of from 15° to 25° C.

12. Catalyst according to claim 1, wherein said sulfate moieties are provided by impregnation with at least one member selected from the group consisting of aqueous sulfuric acid and aqueous ammonium sulfate.

* * * * *